United States Patent
Marukawa (10) Patent No.: US 6,836,511 B1
(45) Date of Patent: Dec. 28, 2004

(54) APPARATUS FOR PROCESSING A REPRODUCED DIGITAL SIGNAL

(75) Inventor: Shoji Marukawa, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/554,456

(22) PCT Filed: Oct. 12, 1999

(86) PCT No.: PCT/JP99/05602

§ 371 (c)(1),
(2), (4) Date: Jul. 20, 2000

(87) PCT Pub. No.: WO00/22620

PCT Pub. Date: Apr. 20, 2000

(30) Foreign Application Priority Data

Oct. 13, 1998 (JP) .......................... 10/290145

(51) Int. Cl.$^7$ ................................ H03H 7/40
(52) U.S. Cl. ..................... 375/232; 375/263; 375/350; 708/323
(58) Field of Search ................. 375/229, 230, 375/232, 262, 263, 265, 341, 350; 708/300, 322, 323

(56) References Cited

U.S. PATENT DOCUMENTS

| | | | | |
|---|---|---|---|---|
| 5,327,298 A | * | 7/1994 | Ottesen et al. ................. | 360/48 |
| 5,341,249 A | | 8/1994 | Abbott et al. | |
| 5,406,427 A | * | 4/1995 | Shimoda ........................ | 360/51 |
| 5,526,200 A | * | 6/1996 | Yada ........................... | 360/51 |
| 5,588,011 A | | 12/1996 | Riggle | |
| 5,719,843 A | * | 2/1998 | Nakajima et al. ......... | 369/59.22 |
| 5,781,590 A | * | 7/1998 | Shiokawa et al. ........... | 375/341 |
| 5,872,666 A | * | 2/1999 | Saiki et al. .................... | 360/46 |
| 6,249,398 B1 | * | 6/2001 | Fisher et al. .................. | 360/65 |
| 6,385,239 B1 | * | 5/2002 | Okamoto et al. ........... | 375/232 |

FOREIGN PATENT DOCUMENTS

| | | |
|---|---|---|
| EP | 0 750 306 | 12/1996 |
| JP | 6-243598 | 9/1994 |
| JP | 6-267203 | 9/1994 |

OTHER PUBLICATIONS

"A PRML System for Digital Magnetic Recording", by Cideciyan et al., IEEE Journal on Selected Areas in Communications, vol. 10, No. 1 (1992), pp. 38–56.

* cited by examiner

Primary Examiner—Dac V. Ha
(74) Attorney, Agent, or Firm—McDermott Will & Emery LLP (57) ABSTRACT

A digital signal processing apparatus for reading out a signal from a recording medium of a digital recording apparatus of high-frequency cutoff type is provided which includes: a read head 2 for reading out the recorded signal from the recording medium 2; a low-pass filter 3 for removing high frequency noise from the output signal of the read head 2; an analog/digital converter 4 for converting the analog reproduced signal filtered by the low-pass filter 3 to a digital reproduced signal; an FIR filter 5 for filtering the digital reproduced signal with the use of an adaptive equalization coefficient so that the frequency response of the signal is equalized with the partial response which has a frequency characteristic suited for reading the reproduced signal; an adaptive equalization coefficient setting device 6 and a partial response temporal judgment device 7 for determining the adaptive equalization coefficient; and a Viterbi decoder 8 for decoding a partial response equalized data released from the FIR filter 5 to a data for judgment.

13 Claims, 7 Drawing Sheets

(a) Eye pattern for partial response (1, 1)

(b) Eye pattern for partial response (1, 2, 1)

(c) Eye pattern for partial response (1, 3, 3, 1)

(d) Eye pattern for partial response (1, 2, 2, 1)

(d) Eye pattern for partial response (3, 4, 4, 3)

FIG. 5

PRIOR ART

FIG. 6

Frequency response of optical section of DVD system

FIG. 7

PRIOR ART

PRIOR ART

FIG. 10

APPARATUS FOR PROCESSING A REPRODUCED DIGITAL SIGNAL

FIELD OF THE INVENTION

The present invention relates to a digital reproduced signal processing apparatus and particularly, to a digital reproduced signal processing apparatus which employs partial response suited for use in a digital reproduced signal processing circuit provided in a playback system for reproduction of digital records based on code words where the minimum code length is relatively extensive.

BACKGROUND OF THE INVENTION

The attention has recently been focused on digital recording media including compact disks (referred to as CDs hereinafter) and digital versatile disks (referred to as DVDs hereinafter) which can save records almost semipermanently.

For playing back signals recorded on CDs and DVDs, a variety of analog reproduced signal processing apparatuses are commonly used because their circuit size is relatively simple and small and thus can be fabricated at less cost.

Figure 7:
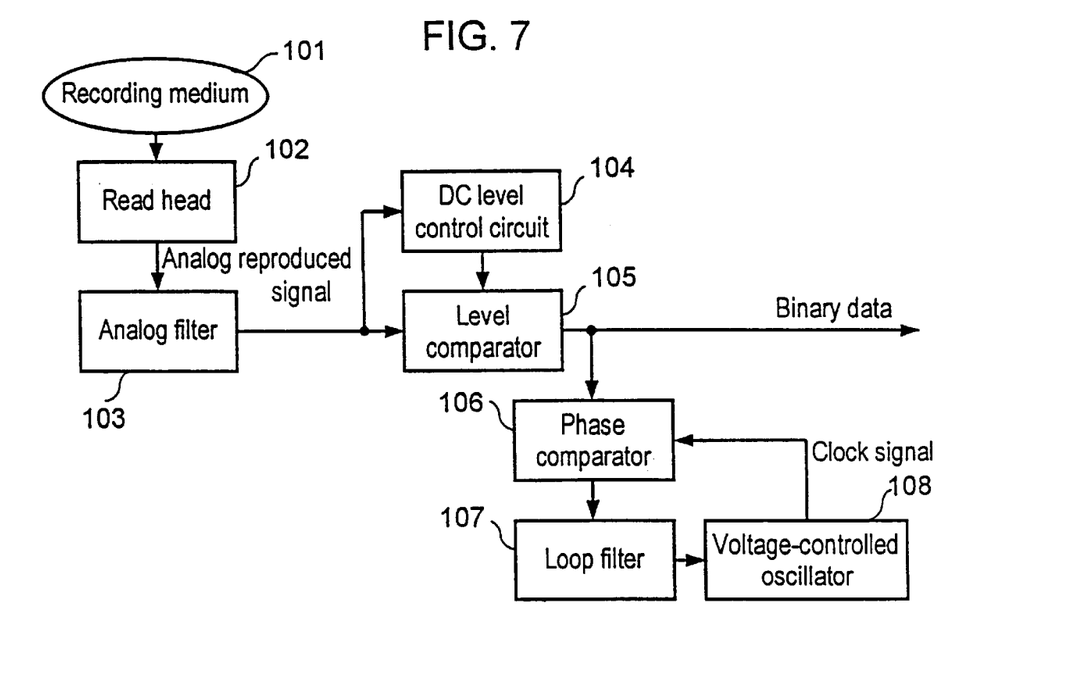
FIG. 7 is a schematic diagram of a conventional analog reproduced signal processing apparatus for DVD system.

As a first conventional example, an analog DVD reproduced signal processing apparatus is now explained referring to FIG. 7.

FIG. 7 is a block diagram 2 showing an arrangement of a conventional analog reproduced signal processing apparatus Z, where a reproduced signal runs as is explained below.

As shown in FIG. 7, the analog reproduced signal is read out from a recording medium 101 with a read head 102 and fed to an analog filter 103. The filter 103 removes high frequency noise components in the signal and also emphasizes a particular frequency range of the signal to minimize jitters.

The signal filtered by the filter 103 is then transferred to a DC level control circuit 104 and a level comparator 105.

The DC level control circuit 104 extracts a DC component from the filtered analog reproduced signal and releases it to the comparator 105 where it is used to determine a slice level.

The comparator 105 compares the filtered analog reproduced signal with the slice level to judge whether it is greater or smaller than the level and its binary judgment is released as a binary data.

The binary data is fed to a phase comparator 106 where it is compared in phase with a clock signal delivered from a voltage-controlled oscillator 108. A phase error signal resulting from an error in the phase comparison is transmitted via a loop filter 107 to the voltage-controlled oscillator 108 where it is used for controlling the oscillation on the clock signal.

While a procedure of signal processing in the analog reproduced signal processing apparatus Z is carried out as described above, the reproduced signal read out from CD or DVD records has a fair but not satisfied level. It is hence desired to develop improved reproduced signal processing apparatuses for processing the signal at a higher level.

The DVD system uses signals based on "eight to fourteen modulation" (referred to as EFM hereinafter) codes or EFM-Plus codes where the minimum code length of a code word is 3T. The frequency response in an optical section of the DVD system is as shown in FIG. 6.

Figure 6:
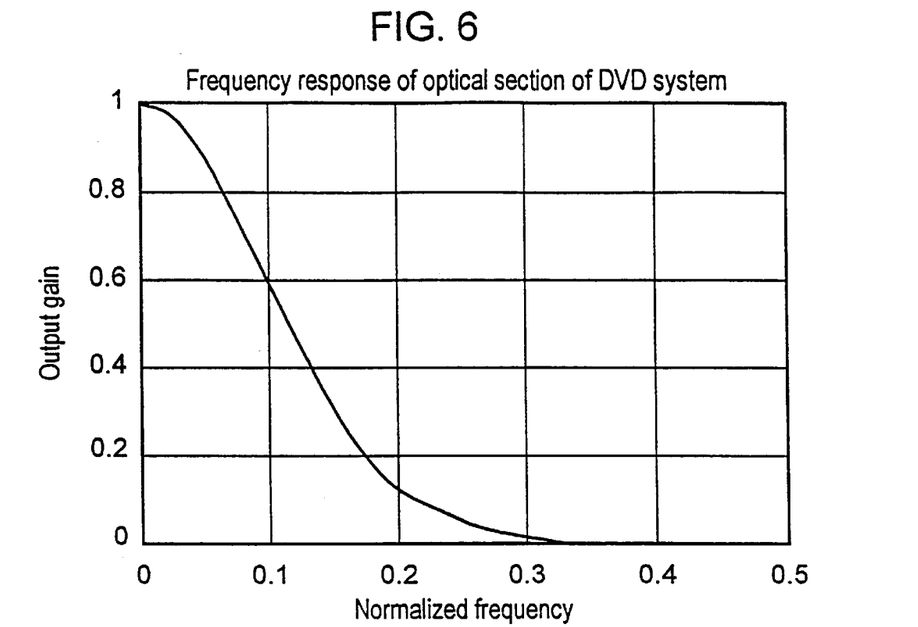
FIG. 6 is a diagram showing a frequency response in an optical section of the DVD system.

In general, DVD records are at high density and the channel rate or reproduction rate of their reproduced signals is set to a higher frequency than that of the frequency response in the optical system shown in FIG. 6. With the frequency response in the optical system, any 1T signal in the code word may hence be reproduced at a significantly attenuated level. More specifically, the setting of the minimum code length to 3T, for example, in FEM permits the minimum pit length to be identified of as large as 3T. If a pit having a length of 1T is contained in a code length of the reproduced rate, its signal size is too small to be identified or picked up, i.e. the 1T signal component is attenuated to a hardly reproduced level.

It is therefore said that the S/N (signal to noise) ratio in the reproduction section of the DVD system is considerably high. Using such a high S/N ratio and the EFM signals of which the minimum code length is limited, the DVD system provides a capability of high density recording.

For magnetic disk systems, a unique reproduced signal processing method called "partial response maximum likelihood" (referred to as PRML hereinafter) has been employed to increase the recording density.

The PRML method is a combination of a partial response technique in the communications technology and a maximum likelihood decoding technique in the code technology. It is hence necessary to select an optimum type of the partial response of which the frequency response matches that of a reproduced signal of RPML.

Figure 8:
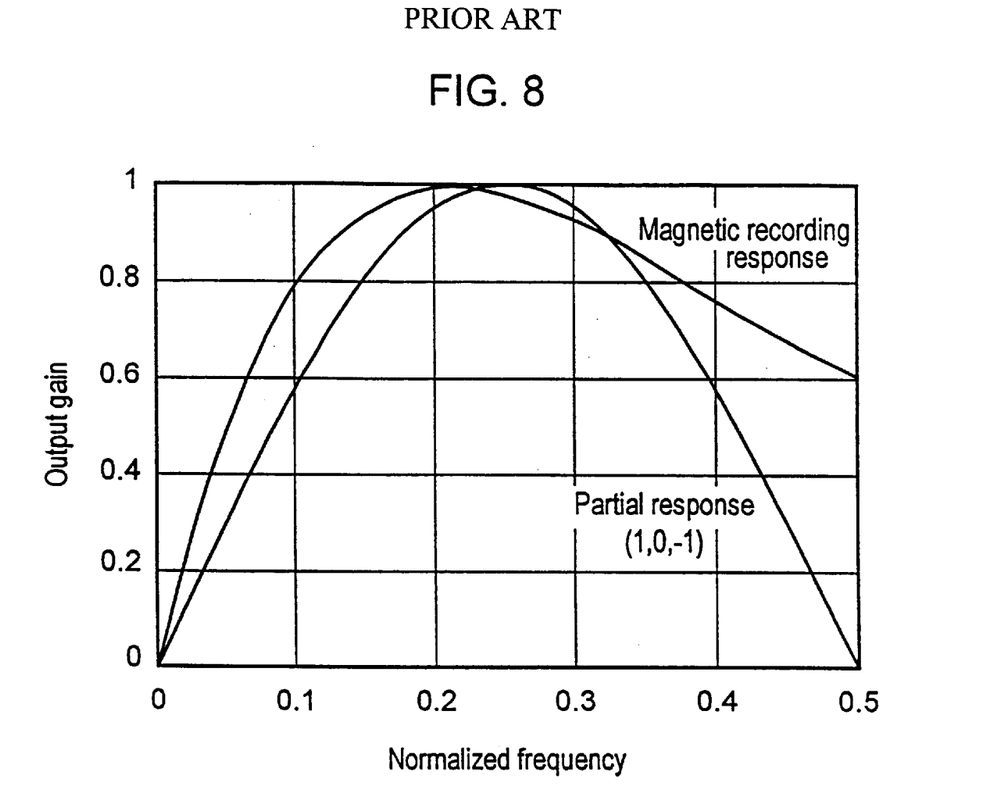
FIG. 8 is a diagram showing the frequency response of a magnetic record reproduced signal from a magnetic disk.

For example, the reproduced signal from a magnetic disk has a band-pass characteristic such as the magnetic recording characteristic shown in FIG. 8. The partial response of which the frequency response matches that of the reproduced signal of the magnetic recording representing the band-pass characteristic may be characterized by (1, 0, -1). As shown in FIG. 8, the frequency response of the reproduced signal of the magnetic recording is very similar to that of the partial response (1, 0, -1) and they may easily be equalized without emphasizing a higher frequency range. In particular, the frequency characteristic of the partial response is closely related to the code words.

The application of the PRML method to the DVD signals has been attempted for increasing the recording density on a DVD medium with the help of the advantage of the PRML method. It is hence desired for processing the DVD signals of the PRML method to develop an improved digital reproduced signal processing apparatus which has a higher capability of reading the signals.

Figure 9:
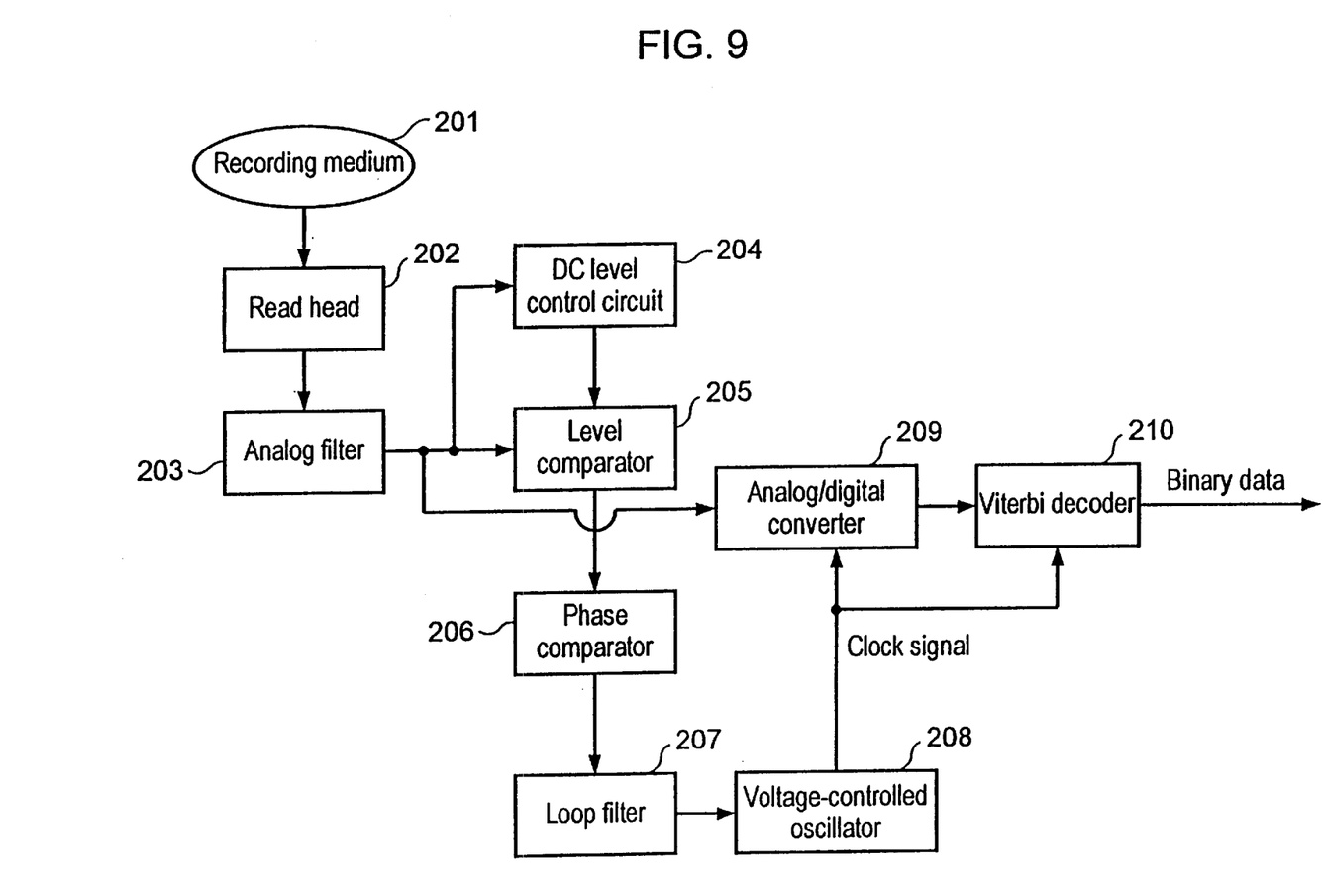
FIG. 9 is a schematic diagram of a reproduced signal processing apparatus for processing a PRML reproduced signal from a magnet optical disk.

FIG. 9 is a block diagram showing the arrangement of a digital reproduced signal processing apparatus, as a second prior art, for magnet optical disks on which signals of the PRML method are recorded. A procedure of processing a reproduced signal in the signal processing apparatus Y is explained below.

As shown in FIG. 9, the analog reproduced signal read by a read head 202 is fed to an analog filter 203 where its high frequency noises are cut off and its signal components at a specific range are controlled to be close to the frequency characteristic of the partial response (1, 1). The analog reproduced signal filtered is then transmitted to a DC level control circuit 204, a level comparator 205, and an analog/digital converter 209.

The DC level control circuit 204 extracts a DC component from the analog reproduced signal and transfers it to the level comparator 205 where its is used as a slice level. The comparator 205 compares the filtered analog reproduced signal with the slice level and releases its comparison signal to a phase comparator 206.

The phase comparator 206 compares the comparison signal with a clock signal supplied from a voltage-controller oscillator 208 and transmits its phase error signal via a loop filter 207 to the voltage-controlled oscillator 208. The clock signal is also fed to the analog/digital converter 209 and a Viterbi decoder 210.

Figure 10:
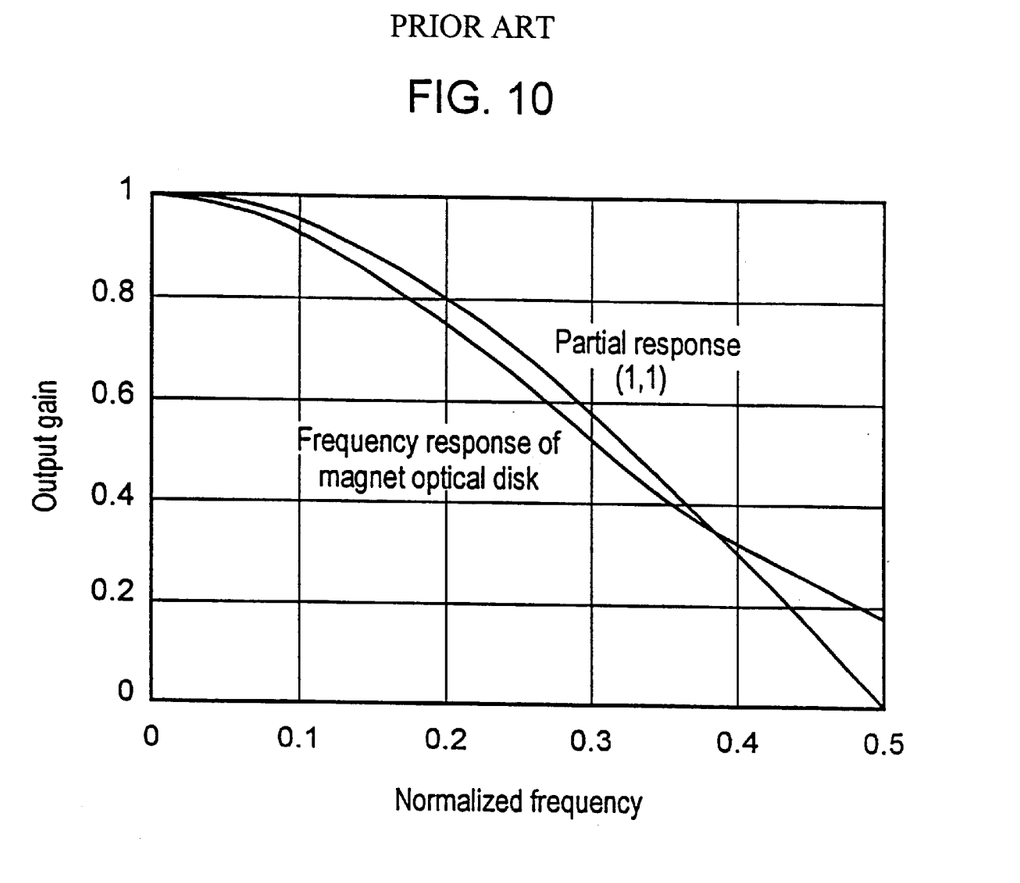
FIG. 10 is a diagram showing the frequency characteristic of a partial response (1, 1) and the frequency response of a reproduced signal from the magnet optical disk.

The filtered analog reproduced signal is converted by the analog/digital converter 209 to a digital signal which is then sent to the Viterbi decoder 210 of the partial response (1, 1) type where it is converted to a binary data FIG. 10 is a frequency response diagram showing a frequency response of the reproduced signal from a magnet optical disk and a partial response (1, 1). As apparent from that figure, the two characteristic curves are similar in shape indicating that the frequency response is good without emphasizing a high frequency range in the equalization.

The digital reproduced signal processing apparatus Y for magnet optical disks carrying the PRML signals allows the signals to be reproduced from their recording medium at a higher fidelity than the analog reproduced signal processing apparatus Z of the first prior art.

However, the digital reproduced signal processing apparatus Y using the partial response (1, 1) still has some disadvantageous features which are hardly compatible with the DVD or CD system.

As described previously, the DVD or CD system employs commonly EFM codes or EFM-Plus codes of which the minimum code length is 3T. The EFM or EFM-Plus codes however carry less information at a high frequency range. Accordingly, while the bit rate for recording in the DVD or CD system is set relatively high, the frequency response of reproduced signals may exhibit a significantly attenuated level at its high frequency range. This causes high-frequency noises in the reproduced signal of EFM or EFM-Plus codes of the DVD or CD system to be emphasized in the digital signal processing using the partial response (1, 1) of the frequency response, thus inhibiting the reading of the reproduced signal at a high fidelity.

Since increasing the order of the partial response declines the effect of emphasizing a high frequency range in the frequency response, a higher order of the partial response may be used to eliminate a problem of emphasizing the high frequency noises in the digital reproduced signal processing apparatus. However, the higher the order of the partial response, the more the circuitry arrangement of the apparatus will be complicated.

Figure 2:
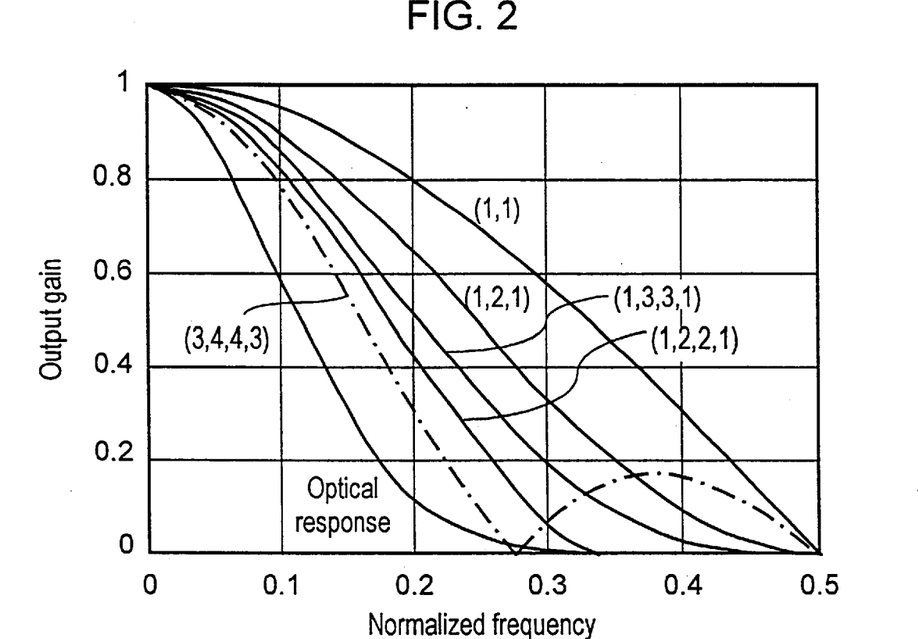
FIG. 2 is a characteristic diagram showing the frequency characteristic of a high-ordered partial response and the frequency response of a DVD reproduced signal.

FIG. 2 illustrates a frequency response of a DVD reproduce signal as well as a partial response. As shown in FIG. 2, the vertical axis represents an output gain and the horizontal axis represents a normalized frequency. It is apparent that the optical frequency response allows the output of a signal at a low frequency range and the output is declined by increase of the normalized frequency; almost no output appears at a frequency of more than 0.3. The three curves of partial response (1, 1), (1, 2, 1), and (1, 3, 3, 1) are expressed by the following equations (1), (2), and (3) respectively. Be noted that 1+D denotes addition of a current signal and a delayed-by-1T signal.

$$1+D=1+\exp(-jw) \quad (1)$$

$$(1+D)^2=(1+\exp(-jw))^2 \quad (2)$$

$$(1+D)^3=(1+\exp(-jw))^3 \quad (3)$$

Now considered is a judgment level on the basis of NRZ (non-return to zero) codes. While the judgment levels used for the NRZ codes are two (denoted by 2-level), for the partial response (1, 1) are three (3-level), for the partial response (1, 2, 1) are five (5-level), and for the partial response (1, 3, 3, 1) are nine (9-level). For example, when a signal of "011111000" is given at the partial response (1, 1), it is added with a delayed-by-1T signal according to the equation (1) of 1+D and hence expressed by "x12222100x", where x is either 0 or 1 depending on the preceding and succeeding values. The sum is hence expressed by three digits "0", "1", and "2" and the number of judgment levels is three. If the number of judgment levels is increased to a higher number such as five or nine, the judgment may be difficult. Also, the Viterbi circuitry arrangement in a Viterbi decoder may be increased in proportion to the square of a judgment level.

It is understood that even if the partial response (1, 3, 3, 1) is used for eliminating the above problems in any conventional digital reproduced signal processing apparatus, the judgment may be much difficult with the emphasizing at a high frequency range reduced and the overall arrangement of a Viterbi circuit will be bulky. Also, the frequency response of a DVD reproduced signal may largely be dissimilar the partial response (1, 3, 3, 1) and the two will hardly be equalized. It is not desirable to use the partial response (1, 3, 3, 1).

Because of the foregoing problems, a variety of analog reproduced signal processing apparatuses have reluctantly been utilized for reproduction of DVD signals.

DISCLOSURE OF THE INVENTION

It is an object of the present invention for solving the foregoing problems to provide a digital reproduced signal processing apparatus which utilizes a partial response having a frequency characteristic suited for picking up the signal of high-frequency cutoff type based on code words of which the minimum code length is 2T or higher and has a simple circuitry arrangement. According to the present invention, the equalization of the digital reproduced signal with the use of a Finite Impulse Response (referred to as FIR hereinafter) filter employs (a, b, b, a) type of partial response as the target characteristic and the FIR filter comprises a delay elements arrange in which any two delay elements are connected to one multiplier, whereby the overall circuitry arrangement can significantly be reduced. In particular, (3, 4, 4, 3) type of the partial response is used thus providing ease of the equalization of the frequency response of DVD signals.

As a first mode for embodying the present invention, a digital reproduced signal processing apparatus for reading out a signal from a recording medium of a digital recording apparatus of high-frequency cutoff type is provided comprising: a read head for reading out the recorded signal and releasing it as an analog reproduced signal; a low-pass filter for removing high frequency noise from the analog reproduced signal; an analog/digital converter for converting the analog reproduced signal filtered by the low-pass filter to a digital reproduced signal; an FIR filter for filtering the digital reproduced signal with the use of an adaptive equalization coefficient; an adaptive equalization coefficient setting device for equalizing the impulse response of the digital reproduced signal with the impulse characteristic of a partial response defined by (a, b, b, a) and determining the adaptive equalization coefficient to release the digital reproduced signal filtered by the FIR filter as an equalized digital reproduced signal; a phase comparator for detecting a phase error signal from the digital reproduced signal or the equalized digital reproduced signal; a partial response temporal judgment device responsive to the output signal of the FIR filter for producing and feeding a temporal data judgment signal to the adaptive equalization coefficient setting device and the phase comparator; a Viterbi decoder for decoding the equalized digital reproduced signal released from the FIR filter to a data for judgment; a loop filter for filtering the phase error signal detected by the phase comparator; a digital/analog converter for converting the filtered phase error signal to an analog signal; and a voltage-controlled oscillator controlled by the output signal of the digital/analog converter for oscillation to produce and feed a clock signal to the Viterbi decoder. The digital reproduced signal processing apparatus of the first mode is hence capable of performing partial response reproduction, is improved in the reading performance as compared with any conventional analog reproducing apparatus, and advantageous in the down-sizing of the circuitry arrangement.

As a second mode for embodying the present invention, the digital reproduced signal processing apparatus of the first mode is modified in that the FIR filter comprises: a delay elements array having a series of delay elements connected one another in a row for delaying the input signal by 1T at each element; a plurality of multipliers, each arranged for multiplying the equalization coefficient by the input signal or a delay signal released from a node of the delay elements array which stands after at least two or more consecutive delay elements of the delay elements array; and an adder for summing the output signals of the multipliers.

As a third mode for embodying the present invention, the digital reproduced signal processing apparatus of the first mode is modified in that the adaptive equalization coefficient setting device is provided with (a, b, b, a) type of the impulse response or partial response which is a target for equalization and arranged to timely update the adaptive equalization coefficient for varying the values a and b in (a, b, b, a) so that the square mean of a difference between the temporal data judgment signal from the partial response temporal judgment and the equalized digital reproduced signal is minimum, whereby a desired characteristic of the partial response can be obtained.

As a fourth mode for embodying the present invention, the digital reproduced signal processing apparatus of the first mode is modified in that the partial response temporal judgment device has a function of converting the data determined by level judgment with a partial response of lower order or any 2-level detection to a judgment level for the partial response which is used for the adaptive equalization and also a function of temporarily identifying a zero-crossing region.

As a fifth mode for embodying the present invention, the digital reproduced signal processing apparatus of the first mode is modified in that the Viterbi decoder comprises: a branch metric calculator having a means for varying the Viterbi judgment level corresponding to the partial response (a, b, b, a); a path metric calculator responsive to a select signal fed from a control signal generator for accumulating the output signals of the branch metric calculator; the control signal generator for producing the select signal indicative of a path at the highest of the probability of being selected by comparing between the output signal of the path metric calculator and the output signal of the branch metric calculator; and a path memory having state memories, so that the adaptive equalization coefficient setting is compatible with (a, b, b, a) type of the partial response.

As a sixth mode for embodying the present invention, the digital reproduced signal processing apparatus of the third mode is modified in that the adaptive equalization coefficient setting device is arranged in that the period of updating the equalization coefficient is thinned out at intervals of nT (n=1, 2, 3, . . . ).

As a seventh mode for embodying the present invention, the digital reproduced signal processing apparatus of the fifth mode is modified in that the Viterbi decoder is arranged in that the paths limited by the code length are eliminated and the Viterbi judgment level can arbitrarily be modified by changing the values a and b in the partial response (a, b, b, a).

As an eighth mode for embodying the present invention, the digital reproduced signal processing apparatus of the first or third or fifth or seventh mode is modified in that the partial response (a, b, b, a) is (3, 4, 4, 3).

As a ninth mode for embodying the present invention, a digital reproduced signal processing method is provided comprising: a first step of reading out a signal by a read head from a recording medium of a digital recording apparatus of high-frequency cutoff type, filtering the signal read out with the use of a low-pass filter for removing its high frequency noise, and analog-to-digital converting it to a digital reproduced signal; a second step of filtering the digital reproduced signal produced at the first step with the use of an FIR filter controlled by an adaptive equalization coefficient for having an equalized digital reproduced signal; a third step of equalizing the impulse response of the digital reproduced signal with the impulse characteristic of a partial response specified by (a, b, b, a) to determine the adaptive equalization coefficient so that the equalized digital reproduced signal is released as an output signal from the FIR filter; and a fourth step of decoding the equalized digital reproduced signal released from the FIR filter to a data for judgment. This signal processing method is hence improved in the reading performance as compared with any conventional analog reproduced signal processing method and is optimum for realizing an improved digital reproduced signal processing apparatus which is significantly reduced in the circuitry arrangement.

As a tenth mode for embodying the present invention, the digital reproduced signal processing method of the ninth mode is modified in that the third step is featured of equalizing the impulse response of the digital reproduced signal produced at the second step with the impulse characteristic of the partial response specified by (3, 4, 4, 3) to determine the adaptive equalization coefficient for releasing from the FIR filter the equalized digital reproduced signal as an output signal and the fourth step is featured of decoding the equalized digital reproduced signal to the data for judgment in accordance with the partial response (3, 4, 4, 3).

DESCRIPTION OF THE PREFERRED EMBODIMENTS

Figure 1:
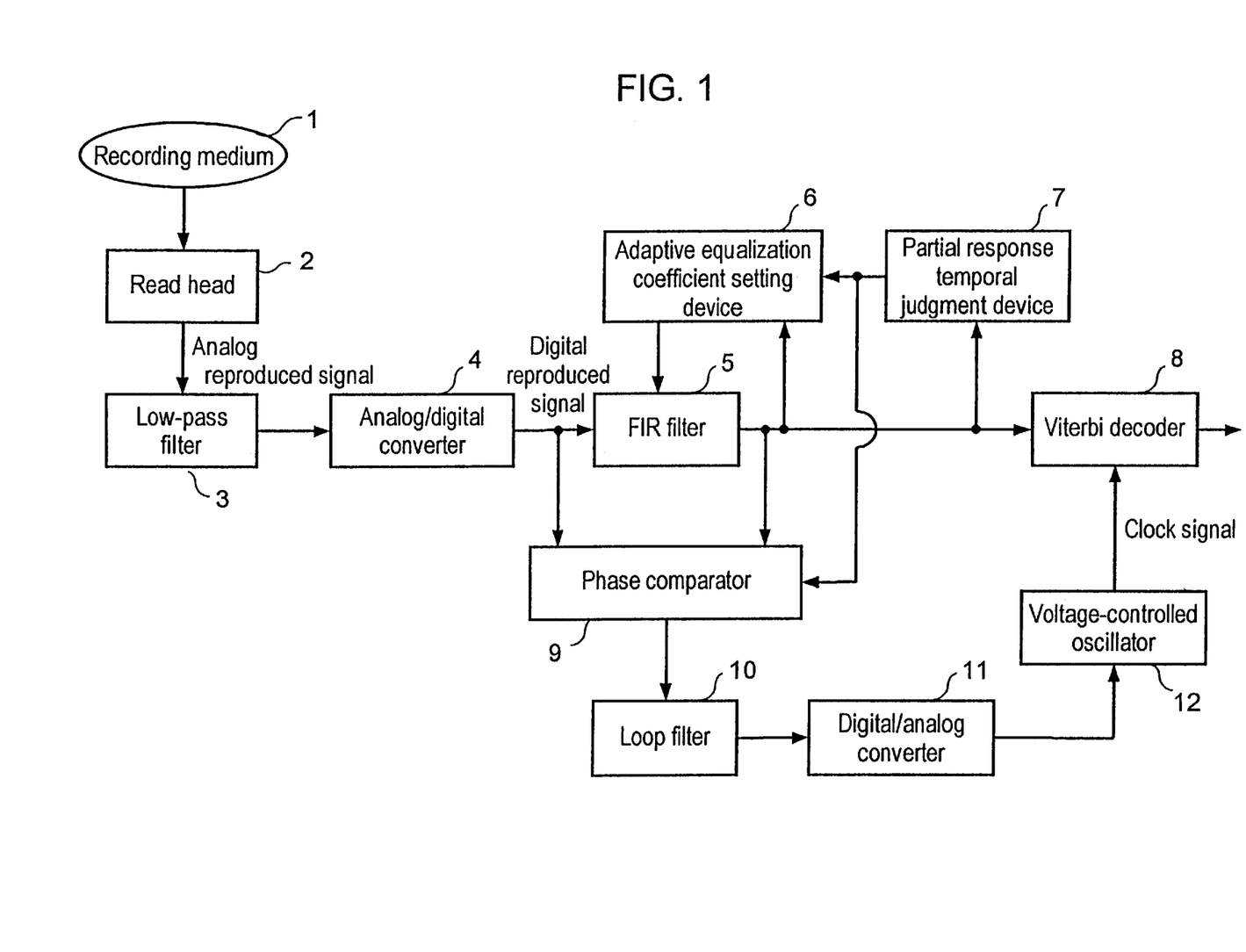
FIG. 1 is a schematic diagram of a digital reproduced signal processing apparatus according to the present invention.

Embodiments of the present invention will be described referring to the accompanied drawings. FIG. 1 is a schematic diagram of a digital reproduced signal processing apparatus X showing a primary embodiment of the present invention. The flow of a signal in the reproduced signal processing apparatus is as explained below. It is assumed that the signal recorded on a recording medium 1 includes code words of which the minimum code length is limited to 2T or longer.

As shown in FIG. 1, the analog reproduced signal read from the recording medium by a read head 2 is fed to a low-pass filter 3 where its high frequency noises are removed and the remaining is released as a filtered reproduced signal. The filtered reproduced signal is fed to an analog/digital converter 4 where it is converted to a digital reproduced signal.

The digital reproduced signal is transferred to an FIR filter 5 and a phase comparator 9. The digital reproduced signal released from the FIR filter 5 is fed to an adaptive equalization coefficient setting device 6, a partial response temporary judgment device 7, a Viterbi decoder 8, and a phase comparator 9.

The output signal of the temporary judgment device 7 is fed to the adaptive equalization coefficient setting device 6 and the phase comparator 9. A signal of equalization coefficient released from the setting device 6 is fed back to the FIR filter 5.

The phase comparator 9 compares in phase the output signal of the temporary judgment device 7 with either the input signal or the output signal of the FIR filter 5 to generate a phase error signal. The phase error signal is fed to a loop filter 10 of which the output is transferred to a digital/analog converter 11.

An analog reproduced signal produced by the digital/analog converter 11 is fed to a voltage-controlled oscillator 12 which then releases a clock signal in response to the input reproduced signal.

The components of the reproduced signal processing apparatus is now explained in more detail referring to the relevant drawings.

Figure 3:
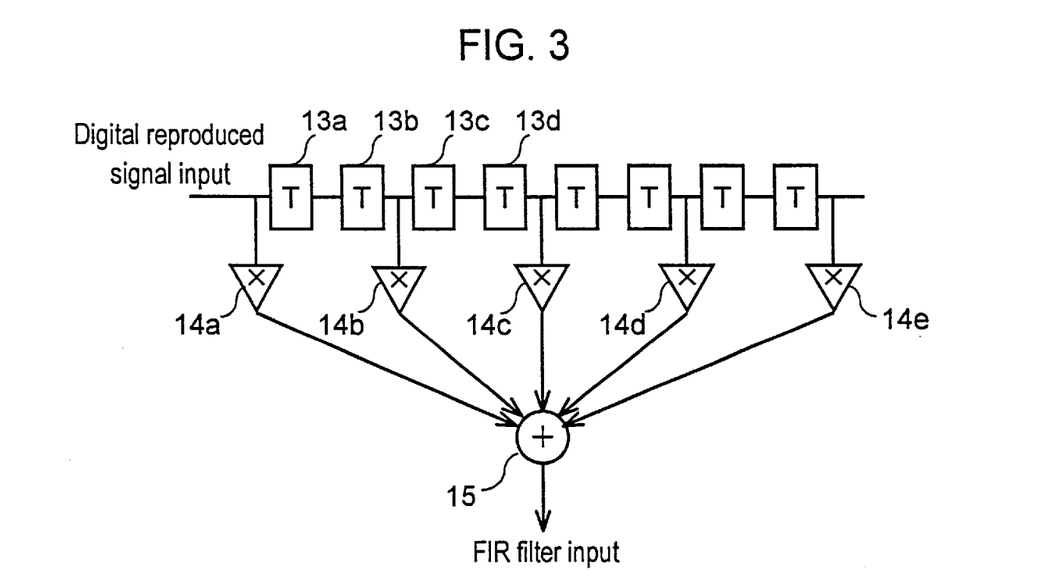
FIG. 3 is a schematic diagram of an FIR filter employed in an embodiment of the present invention.
Figure 4:
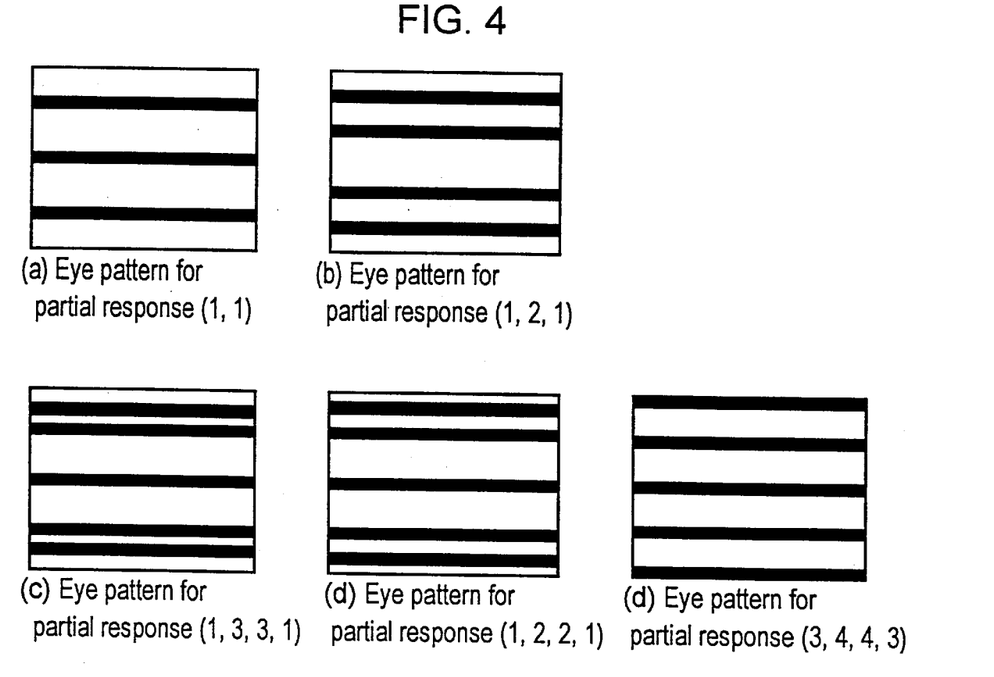
FIG. 4 illustrates schematically eye-patterns showing different types of the partial response.

The FIR filter 5 is provided for filtering the digital reproduced signal produced by the analog/digital converter 4 with the use of an adaptive equalization coefficient determined by the adaptive equalization coefficient setting device 6 and comprises a group of delay elements 13a, 13b, ... and a group of multipliers 14a, 14b, ... and an adder 15, as shown in FIG. 3. The delay elements 13 are data flip-flops which are triggered by the clock signal to delay 1T (one clock time) respectively.

While a conventional FIR filter has each delay element 13 connected at its output to a multiplier 14, the multiplier 14b in this embodiment is connected to the output of two delay elements 13a and 13b for example. The FIR filter 5 is designed for increasing its time size as long as possible to compensate a group delay in the low-pass filter 3 provided in front of the FIR filter 5, because the impulse response corresponding to the frequency response of the reproduced signal is relatively time expanded in a high-density recording apparatus of the high-frequency cutoff type.

The circuitry arrangement of the FIR filter 5 having an extensive time size may be increased in dimensions if each delay element is accompanied with one multiplier. The signal to be recorded on the recording medium 1 is provided of which the minimum code length is 2T or longer and which thus carries less frequency components of 1T. Also, as the reproduced signal is of the high-cutoff type, its frequency response gives no effects in the filtering action. More particularly, the connection of one multiplier to two delay elements may limit the filtering action of the FIR filter 5 more or less at a high frequency range. The components of the reproduced signal in the high frequency range however generate no action on the error rate. It is hence said that the connection of one multiplier to two delay elements hardly affects the filtering action.

As described above, the primary embodiment has the connection of one multiplier to two delay elements hence decreasing the overall circuitry arrangement to a half. Since the multipliers are bulky as compared with the delay elements and the adder among the components of the FIR filter 5, their reduction in number greatly contributes to the minimum size of the FIR filter circuitry arrangement. Also, the adaptive equalization coefficient setting device 6 is a circuit for setting a coefficient of multiplication in the multipliers 14a, 14b, ... and the reduction of the multipliers decreases the circuitry arrangement of the adaptive equalization coefficient setting device 6 to a half, whereby the overall circuitry arrangement of the apparatus can further be reduced.

The adaptive equalization coefficient setting device 6 is provided for determine an optimum adaptive equalization coefficient used for making the impulse response of the digital reproduced signal filtered by the FIR filter 5 equal to a partial response characterized with (a, b, b, a) (referred to as a partial response (a, b, b, a) hereinafter) to have an equalized digital reproduced signal. The model of equalization in the FIR filter 5 is the partial response (a, b, b, a).

The use of the partial response (a, b, b, a) determined by the adaptive equalization coefficient setting device 6 is now explained.

Table 1 shows sets of judgment levels for the frequency characteristic of the partial response. As shown in Table 1, the number of judgment levels for the partial response (1, 2, 1) is five with the minimum code length of 1T and four with 3T. Similarly, the number of judgment levels for the partial response (1, 3, 3, 1) is reduced from seven to five and for the partial response (3, 4, 4, 3) is from nine to five.

TABLE 1

| Type of Partial response | Number of Judgment levels | | |
| --- | --- | --- | --- |
| | Min. code length 1T | Min. code length 2T | Min. code length 3T |
| Partial response (1, 1) | 3 | 3 | 3 |
| Partial response (1, 2, 1) | 5 | 4 | 4 |
| Partial response (1, 3, 3, 1) | 9 | 7 | 5 |
| Partial response (1, 2, 2, 1) | 7 | 7 | 5 |
| Partial response (3, 4, 4, 3) | 9 | 7 | 5 |

It is apparent that the partial response (a, b, b, a) has the number of judgment levels decreased more at 3T of the minimum code length than at 1T as compared with the partial response (1, 2, 1). Also, in view of the circuitry arrangement, the partial response (a, b, b, a) provides that the number of judgment levels is seven at 2T of the minimum code length and five at 3T regardless of the two values a and b, hence permitting the same circuit arrangement to be used throughout the different types of the partial response.

With concerning the above mentioned advantage, this embodiment employs the partial response of (a, b, b, a) type. Two types (1, 2, 2, 1) and (3, 4, 4, 3) of the partial response are featured in that the point where the transmission gain is zero exists at a frequency lower than 1/2T which represents 1/2 the analog/digital conversion frequency or Nyquist frequency and that the gain increases again after the point. The frequency characteristic of the partial response (3, 4, 4, 3) is most similar to that of a signal optically recorded on a DVD medium. As apparent from FIG. 2, the frequency characteristic of the partial response (3, 4, 4, 3) is very similar at a lower frequency range to the frequency response of the DVD reproduced signal. However, the turnover point is more shifted to the lower frequency side than of the other types of the partial response and may cause the emphasizing effect to be prominent in the frequency characteristic as compared with the other types of the partial response.

As the FIR filter 5 acting as an equalizer in this embodiment has a structure designed for multiplication of an output released at equal intervals of 2T as shown in FIG. 3, it will hardly allow degradation of the frequency response by emphasizing the high frequency range.

The advantage of this embodiment is that, in addition to the use of (3, 4, 4, 3) type of the partial response (a, b, b, a), the equalization between the frequency response of the DVD signal and the frequency characteristic of the partial response can be conducted easily in view of eye patterns.

FIGS. 4a to 4e are schematic eye pattern diagrams showing different types of the partial response. For the partial response (1, 3, 3, 1) shown in FIG. 4c, the distance between two levels at each of an upper end and a lower end is small and the two levels of the eye pattern are hardly separated, whereby the equalization with (1, 3, 3, 1) will be difficult. The partial response (1, 2, 2, 1) shown in FIG. 4d has the two levels spaced wider than that of the eye pattern shown in FIG. 4c. The eye pattern of the partial response (3, 4, 4, 3) shown in FIG. 4e indicates that the two levels are spaced further more hence allowing ease of the equalization with the frequency response of DVD signals. It is thus preferred in this embodiment to use the partial response (3, 4, 4, 3).

The adaptive equalization coefficient setting device 6 in the embodiment of the present invention shown in FIG. 1 will now be explained briefly about its function and the adaptive equalization coefficient to be determined.

The adaptive equalization coefficient setting device 6 requires a temporal judgment level which is used to calculate the adaptive equalization coefficient with the use of an algorithm of least means square (referred to as LMS hereinafter). The LMS provides a feedback function for minimizing the square error between desired response and transmission line response. The desired response is expressed by the temporal judgment level in the adaptive equalization coefficient setting device 6. Also, the transmission line response is a digital reproduced signal which is received from the FIR filter 5 and equalized with the frequency characteristic of the partial response. The setting device 6 treats as the equalized error signal a difference between the temporal judgment level and the equalized digital reproduced signal. More particularly, the adaptive equalization coefficient setting device 6 performs adaptive equalization of minimizing a square of the equalized error signal in order to update the equalization coefficient of the FIR filter 5. The LMS equation for equalization coefficient setting is denoted below by (4).

$$P(n(t+1))=P(nt)+(Ak \times E(nt) \times X(nt)) \quad (4)$$

(where t=0, 1, 2, ...).

It is also noted that P(nt) is a current coefficient, P(n(t+1)) is an updated coefficient, Ak is a tap gain, E(nt) is equalization error, and X(nt) is an FIR input signal.

Assuming n=1 in the equation (4), the adaptive equalization coefficient setting device 6 performs a feedback action at each rate. When n=2, the setting device 6 thins out one clock. In the setting device 6, the selection of n allows the period of updating the equalization coefficient to be shortened at intervals of nT.

In case that the temporal judgment level is false, the equalization error signal representing the difference between the temporal judgment level and the transmission line response or equalized digital reproduced signal becomes incorrect. As the equalization error signal is incorrect, the LMS calculation results in fault. Accordingly, the determination of the adaptive equalization coefficient by the adaptive equalization coefficient setting device 6 is disabled. More specifically, the probability of misconducting the temporal judgment level may produce a fault equalization error signal and result in a fault LMS calculation.

When the output signal of the Viterbi decoder 8 shown in FIG. 1 is utilized as the temporal judgment level, the reliability for judgment will be higher than that with the equalized digital reproduced signal after filtered with the FIR filter 5. However, the LMS is a feedback calculation and, when the determination of the judgment level is delayed, the loop characteristic may be declined. It is hence unfavorable to use the output signal of the Viterbi decoder 8 as the temporal judgment level for the LMS.

For compensation, the embodiment of the present invention (FIG. 1) employs the partial response temporal judgment device 7. The temporal judgment device 7 determines the temporal judgment level for the LMS from the output signal of the FIR filter 5. In more detail, the waveform of the actual DVD reproduce signal may appear in an asymmetrical shape where the amplitude is different between the positive side and the negative side over the zero level. This shuts out the eye pattern regardless of the application of the partial response (3, 4, 4, 3). Although the output signal level is measured, the LMS calculates a misjudgment and the equalization may fail.

Through the LMS action without involvement of the Viterbi decoding, the less the number of thresholds, the more the probability of producing a fault judgment is reduced. More particularly, in the level judgment, e.g. discrimination of S/N signals over a threshold, when the number of thresholds is small without involvement of the Viterbi decoding, the probability of producing a fault judgment decreases.

The partial response temporal judgment device 7 in this embodiment calculates the temporal judgment level for the partial response (3, 4, 4, 3) from the judgment level for the partial response (1, 1). This is because the partial response (1, 1) has only three thresholds as compared with five thresholds for the partial response (3, 4, 4, 3) and thus is low in the probability of producing a fault judgment. It may be possible to use directly the thresholds for the partial response (3, 4, 4, 3) without the partial response temporal judgment device 7. However, when the thresholds are used five, the probability of producing a fault judgment will increase and the circuitry arrangement of such a partial response of high order will be bulky. It is hence favorable in view of the processing speed and the circuitry arrangement size to use the judgment levels for the partial response (1, 1) with the temporal judgment device 7. Moreover, as explained below, the use of temporal judgment levels hardly involves the above problems and the judgment levels for the partial response (1, 1) can be utilized as the temporal judgment levels.

The transmission characteristics of (1, 1) and (3, 4, 4, 3) types of the partial response are expressed by the equations (5) and (6) respectively.

Transmission characteristic of $(1, 1)=(1+D)$      (5)

Transmission characteristic of $(3, 4, 4, 3)=(3+4D+4D^2+3D^3)$      (6)

The transmission characteristic of the partial response (3, 4, 4, 3) is calculated by multiplying by a specific value the result determined with the three judgment levels for the partial response (1, 1) as denoted in the equation (7).

$$(1+D)\times(3+D+3D^2)=(3+4D+4D^2+3D^3) \quad (7)$$

The temporal judgment may be calculated using the two judgment levels. The transmission characteristic for judgment with two judgment level is 1 and the transmission characteristic of the partial response (3, 4, 4, 3) to be determined is denoted by the equation (6). Accordingly, while a 2-level detector is provided in the circuit, the transmission characteristic is calculated by multiplying the equation (6) by a result given from the judgment with 2-level detector.

In such a manner, the temporal judgment levels can be obtained which are stable and not detached from those calculated from judgment with the five judgment levels for the partial response (3, 4, 4, 3) to which the equalization is made. The two values a and b or multiplication coefficients for the partial response (a, b, b, a) may arbitrarily be determined.

The partial response temporal judgment device 7 is also designed for feeding a zero-crossing judgment signal and an inclination judgment signal to the phase comparator 9 (FIG. 1). Those judgment signals are produced from the judgment signals defined by the temporal judgment levels for the partial response (1, 1). The action of the partial response temporal judgment device 7 consistently provides the temporal judgment levels for adaptive equalization and the zero-crossing detection required for phase comparison. Accordingly, the phase comparator 9 is improved in the performance. Also, the use of the adaptive equalization coefficient setting device 6 connected to the temporal judgment device 7 allows selection of a desired type of the partial response suited to the reproduced signal to be processed and contributes to the dimensional reduction of the circuitry arrangement by thinning out the multipliers.

The phase comparator 9 produces a phase error signal from a combination of the zero-crossing judgment signal, the inclination judgment signal, the digital reproduced signal before filtered with the FIR filter 5, and the digital reproduced signal after equalization. The equalized digital reproduced signal released from the FIR filter 5 carries favorable information for detecting the phase error but its filtering in the FIR filter 5 may be time-consuming hence causing a delay which affects the performance of PLL (phase locked loop). More specifically, when a feedback delay is increased in the feedback control loop, phase margin for the system will decrease thus inhibiting the increase of gain and impairing the pull-in characteristics and the response to external disturbance.

The digital reproduced signal before filtered with the FIR filter 5 has no delay and allows no loop delay in the system. However, the signal is not subjected to the equalization and the signal-based phase error signal may contain a small degree of discrepancy. The phase comparator 9 in this embodiment is designed to receive both the filtered and unfiltered signals. More particularly, its switches the two signals from one to the other between diminishing of loop delay in the PLL and acquirement of a high-quality of the phase error.

Figure 5:
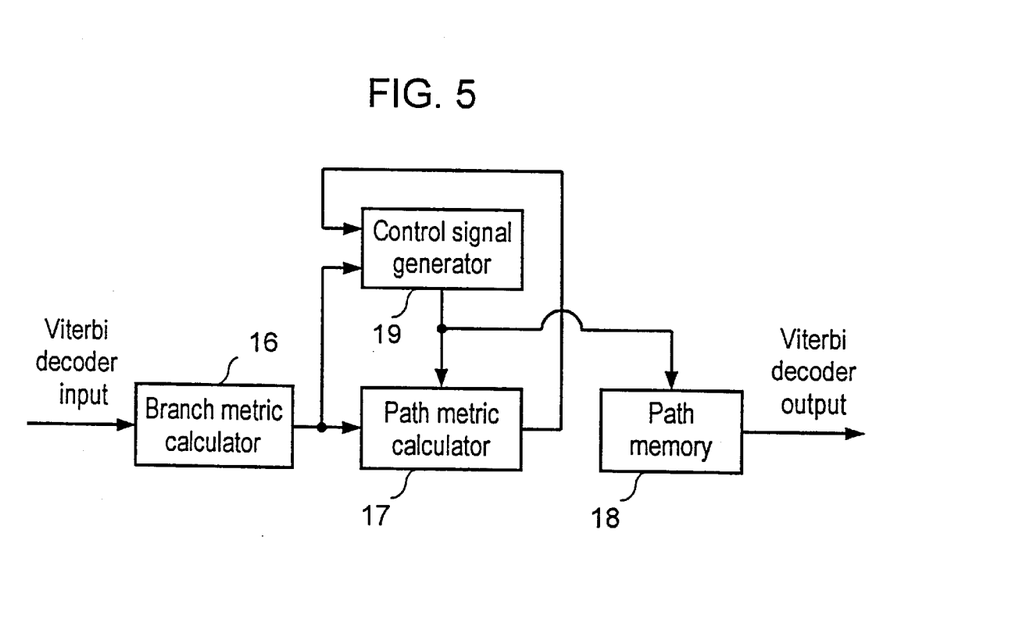
FIG. 5 is a schematic diagram of a Viterbi decoder of the partial response (3, 4, 4, 3) type.

Finally, the Viterbi decoder 8 is briefly explained. FIG. 5 is a schematic diagram of the Viterbi decoder 8 with (3, 4, 4, 3) type of the partial response in this embodiment. The Viterbi decoder 8 comprises a branch metric calculator 16, a path metric calculator 17, a path memory 18, and a control signal generator 19.

The branch metric calculator 16 performs metric calculation of state numbers which are reduced from the state numbers for the partial response (a, b, b, a) by limiting the minimum code length of code words. The metric calculator 16 is provided with a means for varying the Viterbi judgment level corresponding to the partial response (a, b, b, a).

According to the branch metric calculator 16 in this embodiment, the calculation of all combinations of paths based on the partial response (3, 4, 4, 3) or the probability of branch existence means calculation of a difference between the current signal and the Viterbi judgment level or an Euclidean distance. The Euclidean distance used for the judgment is denoted by:

$$(X-A)^2, (X-B)^2, (X-C)^2, (X-D)^2, (X-E)^2$$

where X is a Viterbi input signal and A, B, C, D and E are Viterbi judgment levels.

While the number of the Viterbi judgment levels is five, it is realized by reducing the number with the use of 3T of the minimum code length.

In the branch metric calculator 16 of this embodiment, the Viterbi judgment levels A, B, C, D, and E can arbitrarily be changed.

For example, with the partial response (3, 4, 4, 3), they are A=7, B=4, C=0, D=−4, and E=−7. With the partial response (1, 2, 2, 1), A=3, B=4, C=0, D=−4, and E=−3 are established.

The path metric calculator 17 performs accumulation of the paths in the Euclidean distance which are determined by the branch metric calculator 16. The control signal generator 19 compares between the output signal of the branch metric calculator 16 and the output signal of the path metric calculator 17 to release a select signal indicating selection of a path of which the existence probability is higher. In response to the select signal from the control signal generator 19, the path metric calculator 17 accumulates outputs of the branch metric calculator 16.

The path memory 18 comprises a required number of state memories for carrying out selection of the state in response to the select signal from the control signal generator 19 and releasing the most probable result as the output signal of the Viterbi decoder 8.

The Viterbi decoder 8 in this embodiment shown in FIG. 5 and above described permits the use of the partial response (3, 4, 4, 3) in the equalizing filter 5 so that the distance between the two levels in the eye pattern can be increased and the frequency response of a reproduced signal from high-density recording can be approximated to the frequency characteristic of the partial response, hence providing a more favorable result.

Also, the Viterbi decoder 8 is capable of modifying the Viterbi judgment level thus the Euclidean distance, hence changing the characteristic of Viterbi decoding. More specifically, as the transition of the state of data on the Viterbi decoder 8 or the Viterbi path is significantly controlled, the over circuit arrangement can remarkably be reduced. Moreover, the Viterbi judgment level is modified hence permitting the Viterbi circuit to be adaptively changed depending on the involved signal quality and favorably contributing to the improvement of the quality of reproduced data.

According to the present invention, modifying the Viterbi judgment level allows one signal circuit to be utilized for (a, b, b, a) type of the partial response; (for example, two types, (1, 2, 2, 1) and (3, 4, 4, 3), of the partial response can be realized in the same circuit). Also, as the minimum code length of code words is used in a particular level of limitation, the number of states for the partial response (3, 4, 4, 3), for example, can advantageously be reduced from 10 to 6.

Although this embodiment of the present invention is described substantially focusing the primary components of the digital reproduced signal processing apparatus, the description of a signal processing method according to another embodiment of the present invention will be added. The method starts with a first step where a signal saved on a recording medium of a digital recording apparatus of high-frequency cutoff type is read out by a read head, passed through a low-pass filter where a high frequency range of its analog reproduced signal is removed, and analog-to-digital converted to have a digital reproduced signal. At a second step, the digital reproduced signal produced at the first step is passes through an FIR filter where it is filtered with the use of a given adaptive equalization coefficient to have an equalized digital reproduced signal. At a third step, the impulse response of the digital reproduced signal is equalized with the frequency characteristic of a partial response which is (a, b, b, a) of the impulse response to carry out setting and updating of the adaptive equalization coefficient so that the equalized digital reproduced signal can be released as an output signal from the FIR filter. At a fourth step, the equalized digital reproduced signal released from the FIR filter is decoded to a data for judgment. The method of processing a digital reproduced signal according to the present invention comprises the four steps as explained.

Applicability for Industrial Use

As set forth above, the digital reproduced signal processing apparatus according to the present invention, which reads out a signal saved on a digital recording medium of high-frequency cutoff type where the minimum code length of code words is limited to 2T or longer, provides reproduction of the partial response so that it can significantly be improved in the signal readout as compared with a conventional analog reproduced signal processing apparatus.

What is claimed is:

1. A digital reproduced signal processing apparatus for reading out a recorded signal on a recording medium of a digital recording apparatus of high frequency cutoff type, comprising:

a read head for reading out the recorded signal and releasing it as an analog reproduced signal;

a low-pass filter for removing high frequency noise from the analog reproduced signal;

an analog/digital converter for converting the analog reproduced signal filtered by said low-pass filter to a digital reproduced signal;

an FIR filter for filtering the digital reproduced signal with use of an adaptive equalization coefficient;

an adaptive equalization coefficient setting device for equalizing the impulse response of the digital reproduced signal with the impulse response characteristic of a partial response defined by predetermined coefficients (a,b,b,a) and determining the adaptive equalization coefficient to release the digital reproduced signal filtered by said FIR filter as an equalized digital reproduced signal;

a phase comparator for detecting a phase error signal from the digital reproduced signal or the equalized digital reproduced signal;

a partial response temporal judgment device responsive to the output signal of said FIR filter for producing and feeding a temporal data judgment signal to said adaptive equalization coefficient setting device and said phase comparator;

a Viterbi decoder for decoding the equalized digital reproduced signal released from said FIR filter as a data for judgment;

a loop filter for filtering the phase error signal detected by said phase comparator;

a digital/analog converter for converting the filtered phase error signal to an analog signal; and a voltage-controlled oscillator controlled by the output signal of said digital/analog converter for oscillation to produce and feed a clock signal to said Viterbi decoder.

2. The digital reproduced signal processing apparatus according to claim 1, wherein said FIR filter comprises:

a delay elements array having a series of delay elements connected one another in a row for delaying the input signal by 1T at each element, where T corresponds to a single clock cycle;

a plurality of multipliers, each arranged for multiplying the equalization coefficient by the input signal or a delay signal released from a node of said delay elements array which stands after at least two or more consecutive delay elements of said delay elements array; and an adder for summing the output signals of said multipliers.

3. The digital reproduced signal processing apparatus according to claim 1, wherein said adaptive equalization coefficient setting device is provided with the (a,b,b,a) type of the impulse response or partial response which is a target for equalization and arranged to timely update the adaptive equalization coefficient for varying the values a and b in (a, b, b, a) so that the square mean of a difference between the temporal data judgment signal from said partial response temporal judgment device and equalized digital reproduced signal is minimum, whereby a desired characteristic of the partial response can be obtained.

4. The digital reproduced signal processing apparatus according to claim 3, wherein said adaptive equalization coefficient setting device is arranged in that the period of updating the equalization coefficient is thinned out at intervals of nT (n=1,2,3, . . . ), where T corresponds to a single clock cycle.

5. The digital reproduced signal processing apparatus according to claim 3, wherein the partial response (a,b,b,a) is (3,4,4,3).

6. The digital reproduced signal processing apparatus according to claim 1, wherein said partial response temporal judgment device has a function of converting the data determined by the level judgment with a partial response of lower order or any 2-level detection to a judgment level for the partial response which is used for the adaptive equalization and also a function of temporarily identifying a zero-crossing region.

7. The digital reproduced signal processing apparatus according to claim 1, wherein said Viterbi decoder comprises:

a branch metric calculator having a means for varying the Viterbi judgment level corresponding to the partial response (a,b,b,a);

a path metric calculator responsive to a select signal fed from a control signal generator for accumulating the output signals of said branch metric calculator;

the control signal generator for producing the select signal indicative of a path at the highest of the probability of being selected by comparing between the output signal of said path metric calculator and the output signal of said branch metric calculator; and a path memory having state memories, so that the adaptive equalization coefficient setting is compatible with (a,b,b,a) type of the partial response.

8. The digital reproduced signal processing apparatus according to claim 7, wherein said Viterbi decoder is arranged in that the paths limited by the code length are eliminated and the Viterbi judgment level can arbitrarily be modified by changing the values a and b in the partial response (a,b,b,a).

9. The digital reproduced signal processing apparatus according to claim 8, wherein the partial response (a,b,b,a) is (3,4,4,3).

10. The digital reproduced signal processing apparatus according to claim 7, wherein the partial response (a,b,b,a) is (3,4,4,3).

11. The digital reproduced signal processing apparatus according to claim 1, wherein the partial response (a,b,b,a) is (3,4,4,3).

12. A digital reproduced signal processing method for reading out and processing a signal recorded on a recording medium of digital recording apparatus of high frequency cutoff type, comprising:

a first step of filtering the signal read out by a read head from the recording medium with use of a low-pass filter for removing its high frequency noise and analog-to-digital converting it to a digital reproduced signal;

a second step of filtering the digital reproduced signal obtained at said first step with use of an FIR filter in accordance with an adaptive equalization coefficient for producing an equalized digital reproduced signal;

a third step of equalizing the impulse response of the digital reproduced signal with the impulse response characteristic of a partial response specified by predetermined coefficients (a, b, b, a) to determine the adaptive equalization coefficient so that the equalized digital reproduced signal is released as output signal from said FIR filter; and a fourth step of decoding the equalized digital reproduced signal released from said FIR filter as a data for judgment.

13. The digital reproduced signal processing method according to claim 12, wherein said third step is featured of equalizing the impulse response of the digital reproduced signal produced at said second step with the impulse response characteristic of the partial response specified by (3, 4, 4, 3) to determine the adaptive equalization coefficient for releasing from said FIR filter the equalized digital reproduced signal as an output signal and said fourth step is featured of decoding the equalized digital reproduced signal to the data for judgment in accordance with the partial response (3,4,4,3).

* * * * *